United States Patent
Wang et al.

(10) Patent No.: US 12,096,487 B2
(45) Date of Patent: Sep. 17, 2024

(54) METHOD RELATED TO PUSCH REPETITIONS, USER EQUIPMENT, AND NETWORK DEVICE

(71) Applicant: FG Innovation Company Limited, New Territories (HK)

(72) Inventors: Hai-Han Wang, Taipei (TW); Chia-Hao Yu, Taipei (TW); Chia-Hung Wei, Taipei (TW)

(73) Assignee: FG Innovation Company Limited, New Territories (HK)

( * ) Notice: Subject to any disclaimer, the term of this patent is extended or adjusted under 35 U.S.C. 154(b) by 301 days.

(21) Appl. No.: 17/575,612

(22) Filed: Jan. 13, 2022

(65) Prior Publication Data
US 2022/0232639 A1    Jul. 21, 2022

Related U.S. Application Data (60) Provisional application No. 63/138,114, filed on Jan. 15, 2021.

(51) Int. Cl.
*H04W 74/0833* (2024.01)
*H04L 1/00* (2006.01)
(Continued)

(52) U.S. Cl.
CPC ....... *H04W 74/0841* (2013.01); *H04L 1/0003* (2013.01); *H04W 72/23* (2023.01); *H04W 74/004* (2013.01); *H04W 74/0866* (2013.01)

(58) Field of Classification Search
CPC ......... H04W 74/0838; H04W 74/0841; H04W 74/002; H04W 74/004; H04W 74/008;
(Continued)

(56) References Cited

U.S. PATENT DOCUMENTS 11,234,275 B2 *  1/2022  Chen ............... H04W 24/10
11,564,258 B2 *  1/2023  Tirronen ......... H04W 74/0833
(Continued)

FOREIGN PATENT DOCUMENTS

CN      110062474        7/2019
CN      114071778    * 10/2020  ........... H04W 74/00
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 16)", 3GPP TS 36.213 V16.4.0, Dec. 2020, pp. 1-575.
(Continued)

*Primary Examiner* — Warner Wong
(74) *Attorney, Agent, or Firm* — JCIPRNET (57) ABSTRACT

Methods related to physical uplink shared channel (PUSCH) repetitions, a user equipment (UE), and a network device are provided. In the method, a physical random access channel (PRACH) preamble is transmitted. A random access response (RAR) message responding to the PRACH preamble is received. The RAR message includes an uplink grant that schedules a message 3 (Msg3) PUSCH. A transport block size (TBS) for a transport block (TB) is determined based on a modulation and coding scheme (MCS) field in the uplink grant. The Msg3 PUSCH for the TB is transmitted with the number of PUSCH repetitions. The number of PUSCH repetitions is selected from a set of candidate numbers of PUSCH repetitions based on the MCS field in the uplink grant.

17 Claims, 4 Drawing Sheets

(51) Int. Cl.
*H04W 72/23* (2023.01)
*H04W 74/00* (2009.01)
*H04W 74/08* (2009.01)

(58) Field of Classification Search
CPC ..... H04W 72/00; H04W 72/02; H04W 72/14; H04W 74/08; H04W 74/0866; H04W 74/0883; H04W 74/0891; H04W 36/00725; H04W 52/262; H04W 72/20; H04W 72/21; H04L 1/0002; H04L 1/0003; H04L 1/0004; H04L 1/08; H04L 1/1816; H04L 1/189
See application file for complete search history.

(56) References Cited

U.S. PATENT DOCUMENTS

| | | | | |
|---|---|---|---|---|
| 2019/0037569 | A1* | 1/2019 | Lee | H04W 72/0453 |
| 2019/0045554 | A1* | 2/2019 | Ye | H04L 5/0044 |
| 2020/0077381 | A1 | 3/2020 | Wallen et al. | |
| 2020/0344818 | A1 | 10/2020 | Hoglund et al. | |
| 2021/0051707 | A1* | 2/2021 | Rastegardoost | H04L 5/0051 |
| 2022/0095372 | A1* | 3/2022 | Cozzo | H04W 72/23 |
| 2022/0124833 | A1* | 4/2022 | Taherzadeh Boroujeni | H04W 74/008 |
| 2022/0210814 | A1* | 6/2022 | Khoshnevisan | H04L 5/0051 |
| 2022/0312413 | A1* | 9/2022 | Cozzo | H04L 1/0003 |
| 2023/0102793 | A1* | 3/2023 | Tirronen | H04W 72/0446 370/336 |
| 2023/0199852 | A1* | 6/2023 | Taherzadeh Boroujeni | H04L 1/08 370/329 |
| 2023/0262751 | A1* | 8/2023 | Yu | H04W 74/0833 370/329 |
| 2023/0276436 | A1* | 8/2023 | Pi | H04W 72/1268 370/329 |
| 2023/0363012 | A1* | 11/2023 | Xu | H04L 1/08 |

FOREIGN PATENT DOCUMENTS

| | | | | |
|---|---|---|---|---|
| CN | 117083821 | * | 11/2023 | ........... H04L 1/1858 |
| OA | 18635 | * | 1/2019 | ........... H04W 72/04 |
| WO | 2020130753 | | 6/2020 | |
| WO | WO-2022153445 A1 | * | 7/2022 | ........... H04W 74/08 |

OTHER PUBLICATIONS

"International Search Report (Form PCT/ISA/210) of Related International PCT Application, application No. PCT/CN2022/072007," mailed on Apr. 13, 2022, pp. 1-4.

"3rd Generation Partnership Project; Technical Specification Group Radio Access Network; NR; Physical layer procedures for control (Release 16)," 3GPP TS 38.213 version 16.2.0, Jun. 2020, pp. 1-176.

"3rd Generation Partnership Project; Technical Specification Group Radio Access Network; NR; Physical layer procedures for data (Release 16)," 3GPP TS 38.214 version 16.2.0, Jun. 2020, pp. 1-163.

"3rd Generation Partnership Project; Technical Specification Group Radio Access Network; NR; Requirements for support of radio resource management (Release 16)," 3GPP TS 38.133 version 16.4.0, Jun. 2020, pp. 1-1463.

"3rd Generation Partnership Project; Technical Specification Group Radio Access Network; NR; Physical channels and modulation (Release 16)," 3GPP TS 38.211 version 16.2.0, Jun. 2020, pp. 1-131.

* cited by examiner

| | | |
|---|---|---|
| R | Timing Advance Command | Oct 1 |
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

METHOD RELATED TO PUSCH REPETITIONS, USER EQUIPMENT, AND NETWORK DEVICE

CROSS-REFERENCE TO RELATED APPLICATION(S)

The present application claims the benefit of and priority to U.S. Provisional Patent Application Ser. No. 63/138,114, filed on Jan. 15, 2021, entitled "ENHANCEMENT OF PUSCH REPETITION TYPE A", the content of which is hereby incorporated fully by reference herein into the present disclosure.

FIELD

The present disclosure generally relates to wireless communications, and more particularly, to methods related to physical uplink shared channel (PUSCH) repetitions, a user equipment (UE), and a network device.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

However, it is identified that some IoT use cases such as wearable, wireless sensor network, and video surveillance which have requirements of lower reliability and longer latency compared to URLLC and lower data rate requirement compared to eMBB. UEs with reduced capabilities (RedCap UEs) compared to normal UEs in release-15 (Rel-15) and Rel-16 may be used for the use cases. The RedCap UEs with reduced complexity features such as reduced number of receive (RX) or smaller antenna size may have worse coverage than normal UEs. Hence, coverage recovery may be needed for RedCap UEs since RedCap UEs are very likely to be deployed in the same network as normal UEs, and network deployment is very likely to be deployed based on the coverage of normal UEs. Furthermore, compared to long term evolution (LTE), NR is designed to operate at much higher frequencies such as 28 GHz or 39 GHz in frequency range 2 (FR2). Due to the higher frequencies, it is inevitable that the wireless channel will be subject to higher path-loss making it more challenging to maintain an adequate quality of service that is at least equal to that of legacy radio access technologies (RATs) such as LTE. To provide ubiquitous coverage for a typical subscriber using mobile application of particular importance such as voice service, coverage enhancements may be needed for some physical channels, which is the coverage bottleneck in typical deployment scenarios.

SUMMARY

The present disclosure is directed to methods related to physical uplink shared channel (PUSCH) repetitions, a user equipment (UE), and a network device.

According to one or more exemplary embodiments of the disclosure, a method related to physical uplink shared channel (PUSCH) repetitions and adapted for a user equipment (UE) is provided. The method includes, but is not limited to, the following steps. A physical random access channel (PRACH) preamble is transmitted. A random access response (RAR) message responding to the PRACH preamble is received. The RAR message includes an uplink grant that schedules a message 3 (Msg3) PUSCH. A transport block size (TBS) for a transport block (TB) is determined based on a modulation and coding scheme (MCS) field in the uplink grant. The Msg3 PUSCH for the TB is transmitted with the number of PUSCH repetitions. The number of PUSCH repetitions is selected from a set of candidate numbers of PUSCH repetitions based on the MCS field in the uplink grant.

According to one or more exemplary embodiments of the disclosure, UE is provided. The UE includes, but is not limited to, a transceiver, a memory, and a processor. The transceiver is used for transmitting to receiving signals. The memory is used for storing a program code. The processor is coupled to the transceiver and the memory. The processor is configured to load and execute the program code to perform the following steps. A PRACH preamble is transmitted through the transceiver. A RAR message responding to the PRACH preamble is received through the transceiver. The RAR message includes an uplink grant that schedules an Msg3 PUSCH. A TBS for a TB is determined based on an MCS field in the uplink grant. The Msg3 PUSCH for the TB is transmitted with the number of PUSCH repetitions through the transceiver. The number of PUSCH repetitions is selected from a set of candidate numbers of PUSCH repetitions based on the MCS field in the uplink grant.

According to one or more exemplary embodiments of the disclosure, a method related to PUSCH repetitions and adapted for a network device is provided. The method includes, but is not limited to, the following steps. A PRACH preamble is received. A RAR message responding to the PRACH preamble is transmitted. The RAR message includes an uplink grant that schedules an Msg3 PUSCH, and a TBS for a TB is indicated by an MCS field in the uplink grant. The Msg3 PUSCH for the TB with a number of PUSCH repetitions is received. The number of PUSCH repetitions is one of a set of candidate numbers of PUSCH repetitions indicated by the MCS field in the uplink grant.

According to one or more exemplary embodiments of the disclosure, a network device is provided. The network device includes, but is not limited to, a transceiver, a memory, and a processor. The transceiver is used for transmitting to receiving signals. The memory is used for storing a program code. The processor is coupled to the transceiver and the memory. The processor is configured to load and execute the program code to perform the following steps. A PRACH preamble is received through the transceiver. A RAR message responding to the PRACH preamble is transmitted through the transceiver. The RAR message includes an uplink grant that schedules an Msg3 PUSCH, and a TBS for a TB is indicated by an MCS field in the uplink grant. The Msg3 PUSCH for the TB with a number of PUSCH repetitions is received through the transceiver. The number of PUSCH repetitions is one of a set of candidate numbers of PUSCH repetitions indicated by the MCS field in the uplink grant.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

The acronyms in the present disclosure are defined as follows and unless otherwise specified, the acronyms have the following meanings:

| Acronym | Full name |
|---|---|
| 3GPP | 3$^{rd}$ Generation Partnership Project |
| 5GC | 5G Core |
| ACK | Acknowledgement |
| ARQ | Automatic Repeat Request |
| BS | Base Station |
| BWP | Bandwidth Part |
| CA | Carrier Aggregation |
| CBRA | Contention-based Random Access |
| CCCH | Common Control Channel |
| CE | Control Element |
| CG | Configured Grant |
| CN | Core Network |
| CORESET | Control Resource Set |
| CP | Cyclic Prefix |
| C-RNTI | Cell-Radio Network Temporary Identifier |
| CSI | Channel State Information |
| DC | Dual Connectivity |
| DCI | Downlink Control Information |
| DM-RS | DeModulation Reference Signal |
| DL | Downlink |
| eMBB | Enhanced Mobile Broadband |
| HARQ | Hybrid Automatic Repeat Request |
| IE | Information Element |
| LDPC | Low-Density Parity-Check |
| LSB | Least Significant Bit |
| MAC | Medium Access Control |
| MCG | Master Cell Group |
| MCS | Modulation and Coding Scheme |
| MIMO | Multiple Input Multiple Output |
| mMTC | Massive Machine Type Communication |
| MN | Master Node |
| MSB | Most Significant Bit |
| NG-RAN | Next-Generation Radio Access Network |
| NR | New Radio |
| NW | Network |
| OFDM | Orthogonal Frequency-Division Multiplexing |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PSCell | Primary SCG Cell |
| PRACH | Physical Random Access Channel |
| PUCCH | Physical Uplink Control Channel |
| PUSCH | Physical Uplink Shared Channel |
| RA | Random Access |
| RACH | Random Access Channel |
| RAN | Radio Access Network |
| Rel | Release |

-continued

| Acronym | Full name |
|---|---|
| RLC | Radio Link Control |
| RNTI | Radio Network Temporary Identifier |
| RRC | Radio Resource Control |
| RV | Redundancy Version |
| SCell | Secondary Cell |
| SCG | Secondary Cell Group |
| SCS | Sub Carrier Spacing |
| SDAP | Service Data Adaptation Protocol |
| SDU | Service Data Unit |
| SFI | Slot Format Indicator |
| SFN | System Frame Number |
| SI | System Information |
| SN | Secondary Node |
| SpCell | Special Cell |
| SSB | Synchronization Signal Block |
| TDD | Time-Division Duplex |
| TPC | Transmit Power Control |
| TS | Technical Specification |
| UCI | Uplink Control Information |
| UE | User Equipment |
| UL | Uplink |
| URLLC | Ultra-Reliable and Low-Latency Communication |
| V2X | Vehicle to Everything |

Some terms would be introduced first.

HARQ-ACK: HARQ is a scheme that combines the ARQ (Automatic Repeat reQuest) error control mechanism and FEC (Forward Error Correction) coding in which unsuccessful attempts are used in FEC decoding instead of being discarded. HARQ-ACK feedback is used to indicate whether a HARQ process is successfully received.

$T_{proc,2}$ :

$$T_{proc,2} = \max((N_2 + d_{2,1})(2048 + 144) \cdot \kappa 2^{-\mu} \cdot T_C, d_{2,2})$$

$N_2$ is based on µ of Table 6.4-1 and Table 6.4-2 of 3GPP TS 38.214 for UE processing capability 1 and 2 respectively, where p corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in subclause 4.1 of [4, 3GPP TS 38.211].

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in [11, 3GPP TS 38.133].

If the scheduling DCI triggered a switch of BWP, $d_{2,2}$ equals to the switching time as defined in [11, 3GPP TS 38.133], otherwise $d_{2,2}=0$.

The following description contains specific information pertaining to example embodiments in the present disclosure. The drawings in the present disclosure and their accompanying detailed description are directed to merely example embodiments. However, the present disclosure is not limited to merely these example embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different embodiments may be differed in other respects, and thus shall not be narrowly confined to what is shown in the figures.

The description uses the phrases "in one embodiment," or "in some embodiments," which may each refer to one or more of the same or different embodiments. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some embodiments", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, embodiment, or claim described in the present disclosure, "X/Y" may include the meaning of "X or Y". According to any sentence, paragraph, (sub)-bullet, point, action, behavior, term, alternative, aspect, example, embodiment, or claim described in the present disclosure, "X/Y" may also include the meaning of "X and Y". According to any sentence, paragraph, (sub)-bullet, point, action, behavior, term, alternative, aspect, example, embodiment, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software embodiment may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example embodiments described in this specification are oriented to software installed and executing on computer hardware, nevertheless, alternative example embodiments implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station (or called a network device) may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UNITS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some related technologies are introduced first.

In Rel-15 NR, PUSCH repetition type A is supported with the maximum number of PUSCH repetitions of 8, and one repetition is within one slot. A number of PUSCH repetitions is configured by a RRC parameter, and a PUSCH has the number of PUSCH repetitions if the PUSCH transmission is not scheduled by a DCI of DCI format 0_0. In other words, PUSCH transmission during initial access, e.g. message 3 (Msg3), cannot be transmitted with PUSCH repetition. The same symbol allocation is used for each PUSCH repetition in consecutive slots starting from the slot in which the first PUSCH repetition is located. The first PUSCH repetition is located in a slot indicated by a DCI scheduling the PUSCH in case of dynamic grant (DG) PUSCH, or located in a slot configured for the PUSCH in case of configured grant (CG) PUSCH. The last PUSCH repetition is located in the K-th slot from the slot in which the first PUSCH repetition is located, where K is configured by pusch-AggregationFactor for DG PUSCH and configured by repK for CG PUSCH. Redundancy version (RV) mapping for the K PUSCH repetitions is based on a configured RV sequence. Specifically, for the nth PUSCH repetitions among the K PUSCH repetitions, n=1, 2, . . . , K, it is associated with (mod(n−1,4)+1)th value in the configured RV sequence. For CG PUSCH, the initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K>8.

If the TDD configuration configured by tdd-UL-DL-ConfigurationCommon or tdd-UL-DL-ConfigurationDedicated indicates one or more symbols of the symbols allocated for a PUSCH repetition in a slot as DL symbols, or if the one or more symbols of the symbols allocated for a PUSCH repetition in a slot are symbols used for SSB transmission, the PUSCH repetition in the slot is dropped. A symbol indicated by tdd-UL-DL-ConfigurationCommon or tdd-UL-DL-ConfigurationDedicated as a DL symbol, a UL symbol, or a flexible symbol is referred as a semi-DL symbol, a semi-UL symbol, or a semi-flexible symbol, respectively. Therefore, in an unpaired spectrum, the number of actually transmitted PUSCH repetitions may be less than the number of PUSCH repetitions configured by a RRC parameter. As such, the coverage of PUSCH in unpaired spectrum may be limited for some TDD configurations.

PUCCH repetition is supported in Rel-15 NR. Similarly, a number of PUCCH repetitions is configured by a RRC parameter, i.e. nrofSlots in PUCCH-Config, which may be available after dedicated PUCCH configuration is provided after initial access.

In Rel-15 NR, DCI format 2_0 may be used for dynamically indicating slot formats for a number of slots if UE is configured to monitor DCI format 2_0. DCI format 2_0 is also referred as dynamic slot format indicator (SFI). A semi-flexible symbol may be indicated as a DL symbol or a UL symbol by a dynamic SFI. UE does not expect a semi-flexible symbol in which a DL transmission is scheduled, e.g. a PDSCH, to be indicated as a UL symbol by dynamic SFI. DCI format 2_0 is configured with a monitoring periodicity. A DCI format 2_0 may indicate slot formats for a number of slots which is larger than the number of slots within a monitoring periodicity of DCI format 2_0. UE expects the slot format of a slot indicated by more than one DCI format 2_0 is consistent. UE expects a symbol in which a DL transmission or an UL transmission is scheduled is indicated as a DL symbol or a UL symbol if a dynamic SFI is received later than the DCI scheduling the DL transmission or the UL transmission, respectively.

Figure 1:
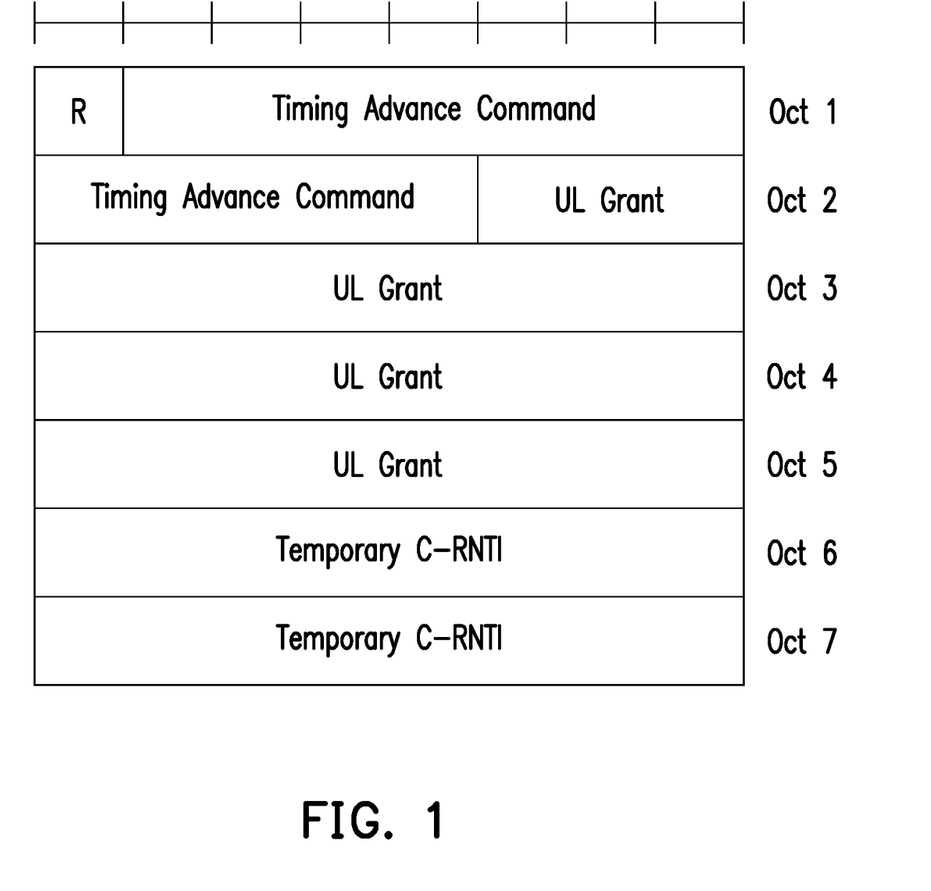
FIG. 1 is a schematic diagram that illustrates a medium access control (MAC) random access response (RAR) according to one of the exemplary embodiments of the disclosure.

FIG. 1 is a schematic diagram that illustrates a medium access control (MAC) random access response (RAR) according to one of the exemplary embodiments of the disclosure. Referring to FIG. 1, in Rel-15, a MAC RAR is of fixed size as depicted in the drawing, and consists of the following fields:

R: Reserved bit, set to "0";
Timing Advance Command: The Timing Advance Command field indicates the index value TA used to control the amount of timing adjustment that the MAC entity has to apply in 3GPP TS 38.213 [6]. The size of the Timing Advance Command field is 12 bits;
UL Grant: The Uplink Grant field indicates the resources to be used on the uplink in 3GPP TS 38.213 [6]. The size of the UL Grant field is 27 bits; Temporary C-RNTI: The Temporary C-RNTI field indicates the temporary identity that is used by the MAC entity during Random Access. The size of the Temporary C-RNTI field is 16 bits.

The MAC RAR is octet aligned.

In Rel-15, an UL grant in MAC RAR (also referred as a RAR UL grant) schedules a PUSCH transmission from the UE. The contents of the RAR UL grant, starting with the MSB and ending with the LSB, are given in Table (1).

TABLE 1

Random Access Response Grant Content field size

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |

TABLE 1-continued

Random Access Response Grant Content field size

| RAR grant field | Number of bits |
| --- | --- |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

If the value of the frequency hopping flag is 0, the UE transmits the PUSCH without frequency hopping; otherwise, the UE transmits the PUSCH with frequency hopping.

The UE determines the MCS of the PUSCH transmission from the first sixteen indexes of the applicable MCS index table for PUSCH as described in TS 38.214.

The TPC command value is used for setting the power of the PUSCH transmission.

The CSI request field is reserved.

The ChannelAccess-CPext field indicates a channel access type and CP extension for operation with shared spectrum channel access.

In Rel-15, PUCCH transmission for HARQ-ACK for message 4 (Msg4) is transmitted by the UE if it received a UE Contention Resolution Identity MAC CE in Msg4 that matches the first 48 bits of the UL CCCH SDU it transmitted in Msg3. The PUCCH transmission is in the slot which is K1 slots after the slot in which Msg4 is received, where K1 is indicated in the DCI format 1_0 scheduling the Msg4. PUCCH repetition is not supported for PUCCH transmission for HARQ-ACK for Msg4.

There are some problems in the existing mechanism.

The number of repetitions counted on the basis of available UL slots:

To ensure coverage target can be met for a PUSCH transmission, the PUSCH transmission should be transmitted with a number of configured PUSCH repetitions in an unpaired spectrum. There may be a need for transmission of PUSCH repetitions until the actually transmitted number of PUSCH repetitions is equal to the configured number of PUSCH repetitions in case PUSCH repetitions in some slots are dropped.

PUSCH repetition type A for Msg3:

A transmission Msg3 with PUSCH repetition type A may be needed to ensure the coverage target of PUSCH during initial access can be met.

PUCCH repetition for HARQ-ACK for Msg4:

A transmission HARQ-ACK for Msg4 with PUCCH repetitions may be needed to ensure the coverage target of PUCCH during initial access can be met.

To deal with the aforementioned issues/problems, the following embodiments are proposed.

First Embodiment

The number of repetitions counted on the basis of available UL slots:

In one embodiment, an available UL slot for a PUSCH repetition is defined as a slot with symbols containing the PUSCH transmission occasion that may be used for a PUSCH repetition configured as semi-UL symbols or semi-flexible symbols.

In one embodiment, for DG PUSCH, the first PUSCH transmission occasion of a PUSCH transmission with PUSCH repetition type A is located in a slot indicated by a DCI scheduling the PUSCH, UE counts the number of PUSCH repetitions in consecutive slots starting from the slot in which the first PUSCH transmission occasion is located.

In some embodiments, if (or only if) the symbols containing a PUSCH transmission occasion in a slot are semi-UL symbols or semi-flexible symbols, the PUSCH transmission occasion is counted as a PUSCH repetition. In on embodiment, the PUSCH transmission with PUSCH repetition type A ends in a slot if the number of counted PUSCH repetitions is equal to the number of PUSCH repetitions configured by a RRC parameter after counting the number of PUSCH repetitions for the slot. In one embodiment, a PUSCH repetition is transmitted in a slot if the PUSCH transmission occasion in the slot is counted as a PUSCH repetition.

In one embodiment, for mapping of redundancy version (RV), the first RV from a configured RV sequence is mapped to the first PUSCH transmission occasion counted as a PUSCH repetition, the next RV from the configured RV sequence is mapped to the next PUSCH transmission occasion counted as a PUSCH repetition, and so on. Specifically, the RV of the (mod(n−1,4)+1)th value in the configured RV sequence is mapped to the n-th PUSCH transmission occasion that is counted as a PUSCH repetition.

In one embodiment, for CG PUSCH, the first PUSCH transmission occasion of a PUSCH transmission with PUSCH repetition type A is located in a slot indicated based on periodicity in configuredGrantConfig and timeDomainOffset in rrc-ConfiguredUplinkGrant for type 1 CG PUSCH or in a slot indicated based on periodicity in configuredGrantConfig and the time offset derived based on the slot in which the PUSCH scheduled by an activation DCI is located within a period for type 2 CG PUSCH. UE may count the number of PUSCH repetitions in consecutive slots starting from the slot in which the first PUSCH transmission occasion is located.

In one embodiment, if (or only if) the symbols containing a PUSCH transmission occasion in a slot are semi-UL symbols or semi-flexible symbols, the PUSCH transmission occasion is counted as a PUSCH repetition. In one embodiment, the PUSCH transmission with PUSCH repetition type A ends in a slot if (or only if) the number of counted PUSCH repetitions is equal to the number of PUSCH repetitions configured by a RRC parameter after counting the number of PUSCH repetitions for the slot. UE may not expect the PUSCH transmission with PUSCH repetition type A ends in a slot not within the same period as the first PUSCH transmission occasion. In one alternative, the PUSCH transmission with PUSCH repetition type A ends in the last slot of a period if (or only if) the number of counted PUSCH repetitions is less than the number of PUSCH repetitions configured by a RRC parameter after counting the number of PUSCH repetitions for the slot.

In one embodiment, if (or only if) UE is configured to monitor DCI format 2_0, a PUSCH repetition is transmitted in a slot if (or only if) the PUSCH transmission occasion in the slot is counted as a PUSCH repetition and if (or only if) the semi-flexible symbols containing the PUSCH transmission occasion are indicated as UL symbols by a DCI format 2_0. In one embodiment, if (or only if) UE is not configured to monitor DCI format 2_0, a PUSCH repetition is transmitted in a slot if (or only if) the PUSCH transmission occasion in the slot is counted as a PUSCH repetition.

In one embodiment, for mapping of redundancy version (RV), the first RV from a configured RV sequence is mapped to the first PUSCH transmission occasion counted as a PUSCH repetition, the next RV from the configured RV sequence is mapped to the next PUSCH transmission occasion counted as a PUSCH repetition, and so on. Specifically, the RV of the (mod(n−1,4)+1)th value in the configured RV sequence is mapped to the n-th PUSCH transmission occasion that is counted as a PUSCH repetition.

In one embodiment, whether a PUSCH transmission with PUSCH repetition type A is using the method as in Rel-15 NR or using the proposed method may be indicated by a RRC parameter. In one embodiment, the proposed method is used if (or only if) a RRC parameter is configured, where the RRC parameter is different from pusch-AggregationFactor which is used for configuration of the number of PUSCH repetitions in Rel-15. The support of PUSCH repetition type A based on the proposed method(s) may be subject to UE capability. For UEs supporting the proposed method(s), such capability is reported to the network or the gNB via, e.g., UE capability signaling.

In one alternative, DCI format 2_0 received after a DCI scheduling a PUSCH with PUSCH repetition type A may indicate a symbol containing a PUSCH transmission occasion counted as a PUSCH repetition as a flexible symbol or a DL symbol in a slot, and the PUSCH repetition is dropped. In one embodiment, the slot is a slot which is located more than a number of slot from the slot in which the first PUSCH transmission occasion is located, where the number of slot may be configured or predefined. In one embodiment, the method is applicable when the periodicity for monitoring DCI format 2_0 is smaller than a number of slots, where the number of slots may be configured or predefined.

In one alternative, for DG PUSCH, the first PUSCH transmission occasion of a PUSCH transmission with PUSCH repetitions is located in a slot indicated by a DCI scheduling the PUSCH, UE counts the number of PUSCH repetitions in consecutive slots starting from the slot in which the first PUSCH transmission occasion is located. In one embodiment, if (or only if) not all symbols containing a PUSCH transmission occasion in a slot are semi-DL symbols, the PUSCH transmission occasion is counted as a PUSCH repetition. In another embodiment, if (or only if) not all symbols containing a PUSCH transmission occasion in a slot are semi-DL symbols, consecutive symbols consisting of semi-UL and/or semi-flexible symbols in the slot may be used for PUSCH transmission. The resource elements located in semi-DL symbols may be punctured. In one embodiment, the PUSCH transmission with PUSCH repetitions ends in a slot if (or only if) the number of counted PUSCH repetitions is equal to the number of PUSCH repetitions configured by a RRC parameter after counting the number of PUSCH repetitions for the slot. In one embodiment, a PUSCH repetition is transmitted in a slot if (or only if) the PUSCH transmission occasion in the slot is counted as a PUSCH repetition.

In one embodiment, for mapping of redundancy version (RV), the first RV from a configured RV sequence is mapped to the first PUSCH transmission occasion counted as a PUSCH repetition, the next RV from the configured RV sequence is mapped to the next PUSCH transmission occasion counted as a PUSCH repetition, and so on. Specifically, the RV of the (mod(n−1,4)+1)th value in the configured RV sequence is mapped to the n-th PUSCH transmission occasion that is counted as a PUSCH repetition.

In one alternative, for CG PUSCH, the first PUSCH transmission occasion of a PUSCH transmission with PUSCH repetitions is located in a slot indicated based on periodicity in configuredGrantConfig and timeDomainOffset in rrc-ConfiguredUplinkGrant for type 1 CG PUSCH or in a slot indicated based on periodicity in configuredGrantConfig and the time offset derived based on the slot in which the PUSCH scheduled by an activation DCI is located within a period for type 2 CG PUSCH. UE may count the number of PUSCH repetitions in consecutive slots starting from the slot in which the first PUSCH transmission occasion is located.

In one embodiment, if (or only if) the symbols containing a PUSCH transmission occasion in a slot are semi-UL symbols and/or semi-flexible symbols, the PUSCH transmission occasion is counted as a PUSCH repetition. In one embodiment, if (or only if) not all symbols containing a PUSCH transmission occasion in a slot are semi-DL symbols, the PUSCH transmission occasion is counted as a PUSCH repetition. In another embodiment, if (or only if) not all symbols containing a PUSCH transmission occasion in a slot are semi-DL symbols, consecutive symbols consisting of semi-UL and/or semi-flexible symbols in the slot may be used for PUSCH transmission. In one embodiment, the resource elements located in semi-DL symbols may be punctured. In one embodiment, the PUSCH transmission with PUSCH repetitions ends in a slot if (or only if) the number of counted PUSCH repetitions is equal to the number of PUSCH repetitions configured by a RRC parameter after counting the number of PUSCH repetitions for the slot. UE may not expect the PUSCH transmission with PUSCH repetitions ends in a slot not within the same period as the first PUSCH transmission occasion. In one alternative, the PUSCH transmission with PUSCH repetitions ends in the last slot of a period if (or only if) the number of counted PUSCH repetitions is less than the number of PUSCH repetitions configured by a RRC parameter after counting the number of PUSCH repetitions for the slot. In one embodiment, if (or only if) UE is configured to monitor DCI format 2_0, a PUSCH repetition is transmitted in a slot if the PUSCH transmission occasion in the slot is counted as a PUSCH repetition and if (or only if) the semi-flexible symbols containing the PUSCH transmission occasion are indicated as UL symbols by a DCI format 2_0. In one embodiment, if (or only if) UE is not configured to monitor DCI format 2_0, a PUSCH repetition is transmitted in a slot if (or only if) the PUSCH transmission occasion in the slot is counted as a PUSCH repetition.

In one embodiment, for mapping of redundancy version (RV), the first RV from a configured RV sequence is mapped to the first PUSCH transmission occasion counted as a PUSCH repetition, the next RV from the configured RV sequence is mapped to the next PUSCH transmission occasion counted as a PUSCH repetition, and so on. Specifically, the RV of the (mod(n−1,4)+1)th value in the configured RV sequence is mapped to the n-th PUSCH transmission occasion that is counted as a PUSCH repetition.

In one alternative, for CG PUSCH, when UE is configured to monitor DCI format 2_0, if (or only if) the symbols containing a PUSCH transmission occasion in a slot are semi-UL symbols or if (or only if) the symbols containing the PUSCH transmission occasion in a slot are semi-UL symbols and semi-flexible symbols which are indicated by a DCI format 2_0 as UL symbols, the PUSCH transmission occasion is counted as a PUSCH repetition. In one embodiment, semi-flexible symbols within Tproc,2 after a PDCCH monitoring occasion in which UE is configured to monitor DCI format 2_0 are considered as being indicated as UL symbols if (or only if) no DCI format 2_0 ending Tproc,2 before the semi-flexible symbols are detected by the UE. It is noted that Tproc,2 may follow the same definition as in e.g., 3GPP TS 38.214 V16.2.0.

In one embodiment, the PUSCH transmission with PUSCH repetition type A ends in a slot if (or only if) the number of counted PUSCH repetitions is equal to the number of PUSCH repetitions configured by a RRC parameter after counting the number of PUSCH repetitions for the slot. UE may not expect the PUSCH transmission with PUSCH repetition type A ends in a slot not within the same period as the first PUSCH transmission occasion. In one alternative, the PUSCH transmission with PUSCH repetition type A ends in the last slot of a period if (or only if) the number of counted PUSCH repetitions is less than the number of PUSCH repetitions configured by a RRC parameter after counting the number of PUSCH repetitions for the slot. In one alternative, the PUSCH transmission with PUSCH repetition type A ends in the X-th slot from the slot in which the first PUSCH transmission occasion is located if (or only if) the number of counted PUSCH repetitions is less than the number of PUSCH repetitions configured by a RRC parameter after counting the number of PUSCH repetitions for the slot, where X may be a configured or predefined value which may depend on the configured number of PUSCH repetitions.

In one embodiment of the above alternatives, a PUSCH transmission occasion is not counted as a PUSCH repetition, if (or only if) it overlaps with a PUCCH with PUCCH repetitions. In one embodiment, the PUCCH may be a configured PUCCH or a PUCCH scheduled by a DCI.

Second Embodiment

PUSCH Repetition Type A for Msg3

Figure 2:
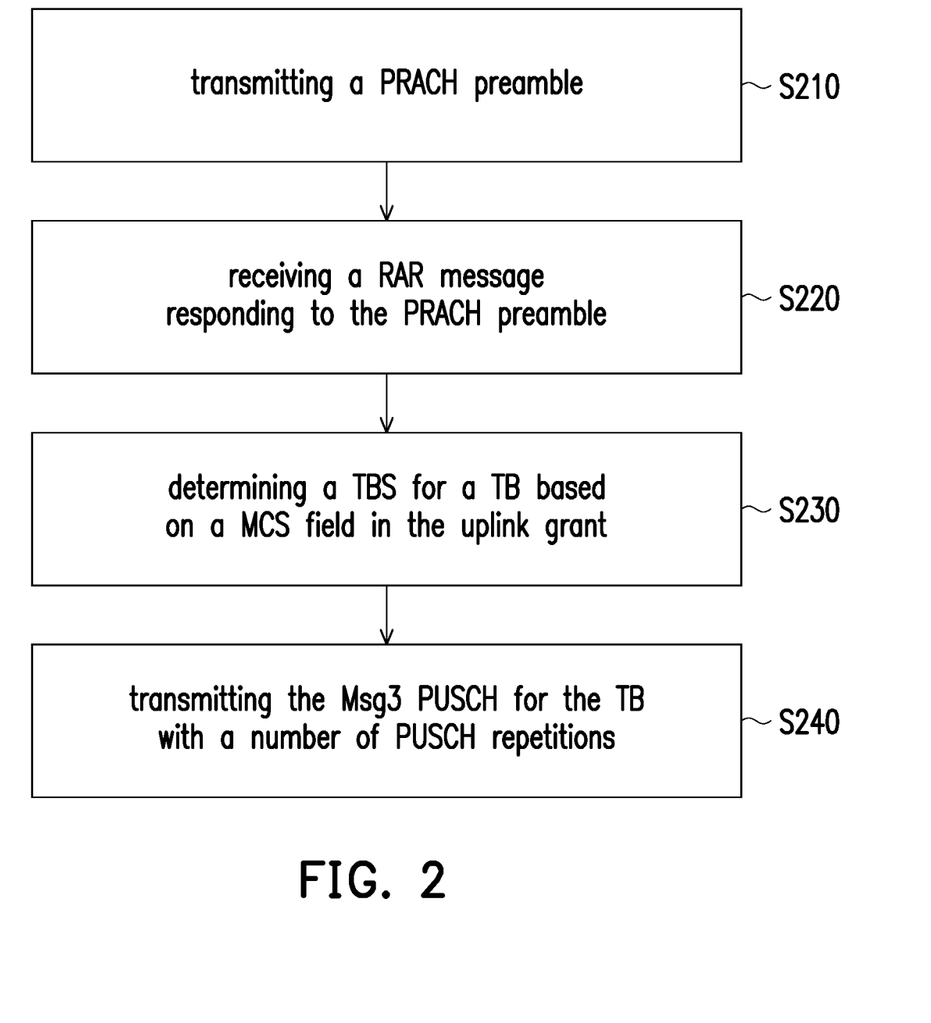
FIG. 2 is a flow chart that illustrates a method adapted for UE according to one of the exemplary embodiments of the disclosure.

FIG. 2 is a flow chart that illustrates a method adapted for UE according to one of the exemplary embodiments of the disclosure. Referring to FIG. 2, a physical random access channel (PRACH) preamble is transmitted to a network device (step S210). A random access response (RAR) message responding to the PRACH preamble is received from the network device (step S220). The RAR message includes an uplink grant that schedules a message 3 (Msg3) PUSCH. A transport block size (TBS) for a transport block (TB) is determined based on a modulation and coding scheme (MCS) field in the uplink grant (step S230). The Msg3 PUSCH for the TB is transmitted with the number of PUSCH repetitions to the network device (step S240). The number of PUSCH repetitions is selected from a set of candidate numbers of PUSCH repetitions based on the MCS field in the uplink grant.

In one embodiment, Msg3 PUSCH transmission with PUSCH repetition type A is indicated in RAR UL grant. An indication may be used to indicate whether PUSCH repetition type A is applied to Msg3 PUSCH transmission. In other words, the UL grant schedules Msg3 PUSCH with PUSCH repetition type A. In one embodiment, the indication may be carried by a subset of bits or all bits in an existing field in the Rel-15/Rel-16 RAR UL grant format. It is noted that a new field may be defined for the bits carrying the indication.

In one embodiment, the CSI request field may be used to indicate whether PUSCH repetition type A is applied to Msg3 PUSCH transmission. In one embodiment, if (or only if) the indication indicates PUSCH repetition type A is applied to Msg3 PUSCH transmission or if (or only if) the RAR UL grant scheduling the Msg3 transmission is received when (or only when) UE transmits a PRACH preamble in a PRACH resource configured for enabling Msg3 PUSCH repetition as in the third embodiment which would be introduced later, and an indication may be used to indicate the number of PUSCH repetitions for Msg3 PUSCH. In one embodiment, the indication may be carried by a subset of bits or all bits in an existing field in the Rel-15/Rel-16 RAR UL grant format. It is noted that a new field may be defined for the bits carrying the indication.

In one embodiment, the CSI request field in RAR UL grant may be used to indicate whether PUSCH repetition type A is applied to Msg3 PUSCH transmission.

In one embodiment, if (or only if) PUSCH repetition type A is indicated, a subset of bits of the MCS field is used to indicate the number of PUSCH repetitions. In one embodiment, a subset of bits of the MCS field is used to indicate the number of PUSCH repetitions. In one embodiment, the subset of bits of the MCS field may be a number of the most significant bits (MSB) of the MCS field. In another embodiment, the subset of bits may be a number of least significant bits (LSB) of the MCS field. For example, the remaining x bits of the MCS field is used to indicate the first $2^x$ indexes of the applicable MCS index table for PUSCH as described in 3GPP TS 38.214.

In one embodiment, UE may receive system information (e.g., system information block 1 (SIB1)) from a network device, and the system information indicates the set of candidate numbers of PUSCH repetitions. For example, one or more number of PUSCH repetitions (i.e., the set of candidate numbers of PUSCH repetitions) may be configured by a RRC parameter in system information, e.g. SIB1, received from a network device, and the subset of bits of MCS field may indicate a value from the one or more number of PUSCH repetitions to be applied for Msg3 PUSCH transmission. In one embodiment, UE may select the number of PUSCH repetitions from a predefined set of candidate numbers of PUSCH repetitions (merely) based on the system information when (or only when) the set of candidate numbers of PUSCH repetitions is contained in the system information.

In one embodiment, UE may receive system information (e.g., SIB1) from a network device and select the number of PUSCH repetitions from a predefined set of candidate numbers of PUSCH repetitions based on the MCS field in the uplink grant when (or only when) the set of candidate numbers of PUSCH repetitions is not contained in the system information. In other words, when (or only when) the received system information does not include the set of candidate numbers of PUSCH repetitions, UE would determine the number of PUSCH repetitions (merely) based on the MCS field in the uplink grant.

In one embodiment, UE may receive system information (e.g., SIB1) from a network device, and the system information includes a configuration of a set of predefined PRACH preambles used for requesting the Msg3 PUSCH with PUSCH repetitions. In one embodiment, UE may select the PRACH preamble (which may be transmitted in step S210) from the set of predefined PRACH preambles used for requesting Msg3 PUSCH with PUSCH repetitions. In some embodiments, UE may transmit one of the predefined PRACH preambles to a network device.

In one embodiment, UE may select the PRACH preamble from the set of predefined PRACH preambles used for requesting Msg3 PUSCH with PUSCH repetitions when (or only when) a Synchronization Signal Block (SSB) have a Reference Signal Received Power (RSRP) below a (RSRP) threshold. In other words, when (or only when) the RSRP of SSB is less than the threshold, the UE selects the PRACH preamble from the set of predefined PRACH preambles used for requesting Msg3 PUSCH with PUSCH repetitions. That is, the Msg3 PUSCH transmission is requested with PUSCH repetitions. Furthermore, when (or only when) the RSRP of SSB is not less than the threshold, the UE does not select the PRACH preamble from the set of predefined PRACH preambles used for requesting Msg3 PUSCH with PUSCH repetitions. That is, the Msg3 PUSCH transmission is requested without PUSCH repetitions.

In one embodiment, UE may interpret the subset of bits of the MCS field is used to indicate a number of PUSCH repetitions for PUSCH from one or more number of PUSCH repetitions in a predefined or default list of a number of PUSCH repetitions if (or only if) there is no RRC parameter for configuration of numbers of PUSCH repetitions provided in system information. In another embodiment, one or more RRC parameters for a configuration of a number of PUSCH repetitions may be configured along/associated with one or more random access resources which may be configured by the gNB via system information, where the random access resources may be configured based on the third embodiment.

In one embodiment, the one or more RRC parameters for configuration of a number of PUSCH repetitions may also be configured by the gNB while UE is in RRC_CONNECTED for a particular purpose (e.g., beam failure recovery). That is, once a random access is initiated for the particular purpose the UE may interpret the subset of bits of the MCS field is used to indicate one of the number of PUSCH repetitions configured for the particular purpose.

In one embodiment, if (or only if) PUSCH repetition type A is indicated, a subset of bits of the MCS field is used together with the PUSCH time resource allocation field to indicate a row (a PUSCH-TimeDomainResourceAllocation) in a time domain resource allocation (TDRA) table configured in PUSCH-TimeDomainResourceAllocationList in PUSCH-ConfigCommon, where up to $2^y$ number of PUSCH-TimeDomainResourceAllocation may be included in PUSCH-TimeDomainResourceAllocationList, and y equals to 4 (number of bits of PUSCH time resource allocation field) plus the number of the subset of bits of the MCS field that is used together with the PUSCH time resource allocation field. A PUSCH-TimeDomainResourceAllocation may include a number of PUSCH repetitions and Msg3 PUSCH is transmitted with the number of PUSCH repetitions if the PUSCH-TimeDomainResourceAllocation is indicated by RAR UL grant.

In one embodiment, one or more PUSCH-TimeDomainResourceAllocationList may be configured in PUSCH-ConfigCommon, with each PUSCH-TimeDomainResourceAllocationList associated with a random access resource. The PUSCH-TimeDomainResourceAllocationList associated with a random access resource is applied for Msg3 PUSCH transmission if (or only if) the RAR UL grant scheduling the Msg3 PUSCH transmission is received in response to UE transmitting a PRACH preamble in the random access resource. It is noted that while the example above assumes reusing the MCS field for repetition number indication, reusing other fields such as the TPC field is feasible as well.

For retransmission of Msg3 PUSCH, the following embodiments may be used to indicate whether a number of PUSCH repetitions may be indicated and applied for retransmission of Msg3 PUSCH.

In one embodiment, a new field in DCI format 0_0 is used to indicate that a number of PUSCH repetitions may be indicated and applied for retransmission of Msg3 PUSCH.

In one embodiment, part of or all bits of an existing field may be used to indicate that a number of PUSCH repetitions may be indicated and applied for retransmission of Msg3

PUSCH. For example, new data indicator (NDI) field, HARQ process number, or UL/SUL indicator may be used. Value of 1 of the bit(s) in the field may be used to indicate that a number of PUSCH repetitions may be indicated and applied for retransmission of Msg3 PUSCH.

The following embodiments may be used to indicate a number of PUSCH repetitions if (or only if) it is indicated that the number of PUSCH repetitions may be indicated and applied for retransmission of Msg3 PUSCH.

In one embodiment, a new field in DCI format 0_0 is used to indicate the number of PUSCH repetitions, and the total size of DCI format 0_0 may be larger than DCI format 0_0 in Rel-15 and Rel-16. The above indication of whether a number of PUSCH repetitions may be indicated and applied for retransmission of Msg3 PUSCH may not be needed for this embodiment, but not limited thereto.

In one embodiment, a new field in DCI format 0_0 is used to indicate the number of PUSCH repetitions, and the total size of DCI format 0_0 is the same as DCI format 0_0 in Rel-15 and Rel-16. In one embodiment, the modulation and coding scheme (MCS) field in DCI format 0_0 is reduced by the number of bits of the new field. The x bits of MCS field with reduced bits is used to indicate the first $2^x$ indexes of the applicable MCS index table for PUSCH as described in 3GPP TS 38.214, where x equals to 5 minus the number of bits of the new field.

In one embodiment, part of or all bits of existing field(s) may be used to indicate the number of PUSCH repetitions that is applied for retransmission of Msg3 PUSCH. For example, new data indicator (NDI) field, HARQ process number, or UL/SUL indicator may be used. In one embodiment, value of 0 of the existing field(s) indicates the first value of the one or more of the configured number of PUSCH repetitions, and the first value equals to 1.

In one embodiment, a subset of bits of the MCS field or part of or all bits of existing field(s), e.g., new data indicator (NDI) field, HARQ process number, or UL/SUL indicator, is used together with the PUSCH time resource allocation field to indicate a row (a PUSCH-TimeDomainResourceAllocation) in a time domain resource allocation (TDRA) table configured in PUSCH-TimeDomainResourceAllocationList in PUSCH-ConfigCommon, where up to $2^y$ number of PUSCH-TimeDomainResourceAllocation may be included in PUSCH-TimeDomainResourceAllocationList, and y equals to 4 (number of bits of PUSCH time resource allocation field) plus the number of the subset of bits of the MCS field or the number of part of or all bits of existing field(s) that is used together with the PUSCH time resource allocation field. A PUSCH-TimeDomainResourceAllocation may include a number of PUSCH repetitions and Msg3 PUSCH is transmitted with the number of PUSCH repetitions if (or only if) the PUSCH-TimeDomainResourceAllocation is indicated by the DCI format 0_0.

In one embodiment, the above embodiments are used if (or only if) RAR UL grant indicated Msg3 PUSCH was transmitted with PUSCH repetitions.

In one embodiment, the above embodiments are used if (of only if) UE transmitted PRACH using PRACH resource configured for coverage recovery or coverage enhancement as in the third embodiment.

In one embodiment, UE may determine the TBS for the TB based on a first number of bits of the MCS field in the uplink grant and select the number of PUSCH repetitions from the set of candidate numbers of PUSCH repetitions based on a second number of bits of the MCS field in the uplink grant. For example, there are 4 bits in the MCS field, 1 bit (i.e., the first number) for indicating the TBS, and 2 bits (i.e., the second number) for indicating the number of PUSCH repetitions. In one embodiment, the MCS field in the uplink grant may include a number of bits which is equal to a sum of the first number of bits and the second number of bits. For example, there are 4 bits in the MCS field, 2 bits (i.e., the first number) for indicating the TBS, and 2 bits (i.e., the second number) for indicating the number of PUSCH repetitions. The candidate TBSs may be defined in 3GPP TS 38.214 table 5.1.3.2-1, but is not limited thereto.

Figure 3:
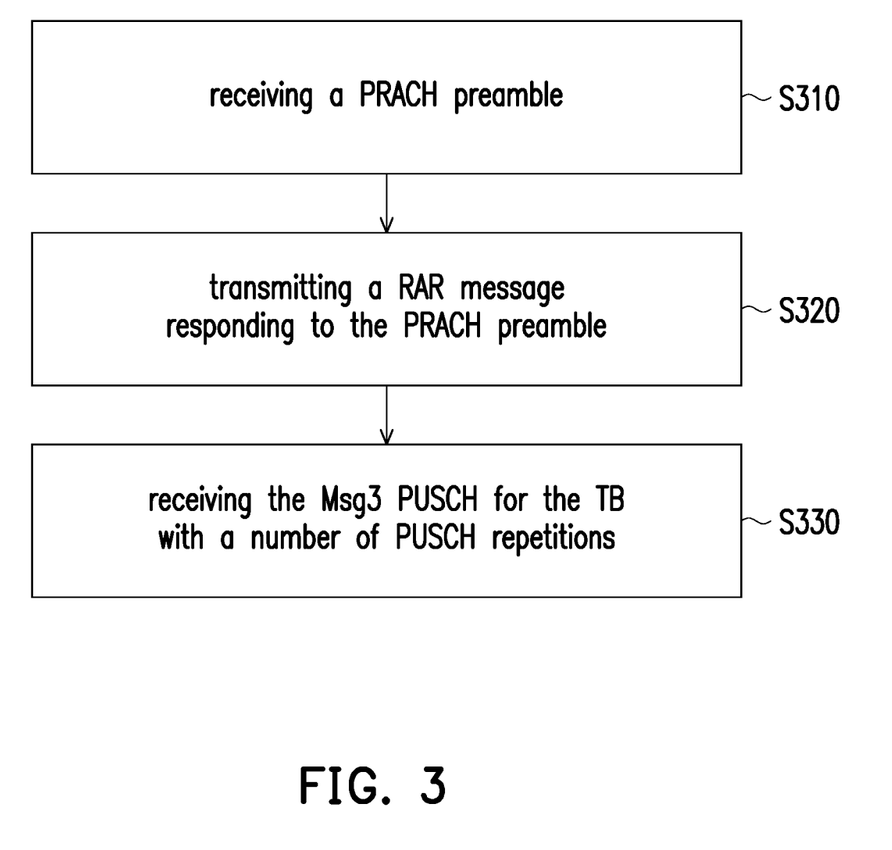
FIG. 3 is a flow chart that illustrates a method adapted for a network device according to one of the exemplary embodiments of the disclosure.

FIG. 3 is a flow chart that illustrates a method adapted for a network device according to one of the exemplary embodiments of the disclosure. Referring to FIG. 3, A PRACH preamble is received from a UE (step S310). A RAR message responding to the PRACH preamble is transmitted to the UE (step S320). The RAR message includes an uplink grant that schedules an Msg3 PUSCH, and a TBS for a TB is indicated by an MCS field in the uplink grant. The Msg3 PUSCH for the TB with a number of PUSCH repetitions is received from the UE (step S330). The number of PUSCH repetitions is one of a set of candidate numbers of PUSCH repetitions indicated by the MCS field in the uplink grant. The details of step S310 to step S330 could be referred to FIG. 1-FIG. 2 and would be omitted.

Third Embodiment

In one embodiment, PRACH resources for UEs that need coverage recovery or coverage enhancement for Msg3 PUSCH is configured. In one embodiment, UE may transmit Msg3 PUSCH with PUSCH repetition type A if (or only if) UE transmits the PRACH resource configured for coverage recovery or coverage enhancement for Msg3 PUSCH. In one embodiment, the PRACH resources configured for coverage recovery or coverage enhancement for Msg3 PUSCH may be a subset of PRACH preambles in the same PRACH resources used by normal UEs. In one embodiment, the PRACH resources configured for coverage recovery or coverage enhancement for Msg3 PUSCH may be transmitted by UEs with reference signal received power (RSRP) measured for the selected SSB lower than a configured or predefined threshold. It is noted that a network device (e.g., gNB) may configure multiple sets of PRACH resources in each cell, and each one is associated with one RSRP. That is, before initiating a random access procedure, the UE may measure SSB and select one set of PRACH resources for the RA procedure.

In one embodiment, the network device (e.g., gNB) may also configure multiple sets of PUSCH repetition configuration (i.e., each PUSCH repetition consists of one or more numbers of PUSCH repetitions). In one embodiment, the subset of bits of the MCS field may indicate a value from the one or more number of PUSCH repetitions configured by a PUSCH repetition configuration to be applied for Msg3 PUSCH transmission and the PUSCH repetition configuration is associated with the PRACH resource the UE selected by considering RSRP as disclosed earlier. In one embodiment, a UE may select PRACH resources configured for coverage recovery or coverage enhancement for Msg3 PUSCH if (or only if) it supports Msg3 PUSCH repetition.

PUCCH repetition for HARQ-ACK for Msg4:

Fourth Embodiment

In one embodiment, one or more numbers of PUCCH repetitions may be configured by a RRC parameter in system information. For example, nrofSlots in PUCCH-Config-Common. In one embodiment, a number of PUCCH repetitions from the one or more numbers of configured PUCCH repetitions is indicated by the DCI format 1_0 scheduling Msg4 for HARQ-ACK transmission for Msg4. The following embodiments may be used.

In one embodiment, the number of PUCCH repetitions is indicated by a new field, and the total size of DCI format 1_0 may be larger than DCI format 1_0 in Rel-15 and Rel-16.

In one embodiment, the number of PUCCH repetitions is indicated by an existing field, e.g., downlink assignment index (DAI) field. In one embodiment, the value of 0 of the existing field indicates the first value of the one or more of the configured numbers of PUCCH repetitions, and the first value equals to 1.

In one embodiment, the PUCCH resources for transmission of Msg4 for HARQ-ACK with PUCCH repetitions are different from the PUCCH resources for transmission of Msg4 for HARQ-ACK without PUCCH repetitions. In one embodiment, the PUCCH resources for transmission of Msg4 for HARQ-ACK with PUCCH repetitions may be configured in a different information element (IE) from PUCCH-ConfigCommon, and PUCCH resource indicator (PRI) and the control channel element (CCE) index of the first CCE carrying the DCI scheduling the Msg4 is used for indicating a PUCCH resource from the PUCCH resources for transmission of Msg4 for HARQ-ACK with PUCCH repetitions.

In one embodiment, the above embodiments are used if (or only if) RAR UL grant indicated Msg3 PUSCH was transmitted with PUSCH repetitions, or if (or only if) Msg3 retransmission was transmitted with PUSCH repetitions.

In one embodiment, the above embodiments are used if (or only if) UE transmitted PRACH using PRACH resource configured for coverage recovery or coverage enhancement as in the third embodiment.

Figure 4:
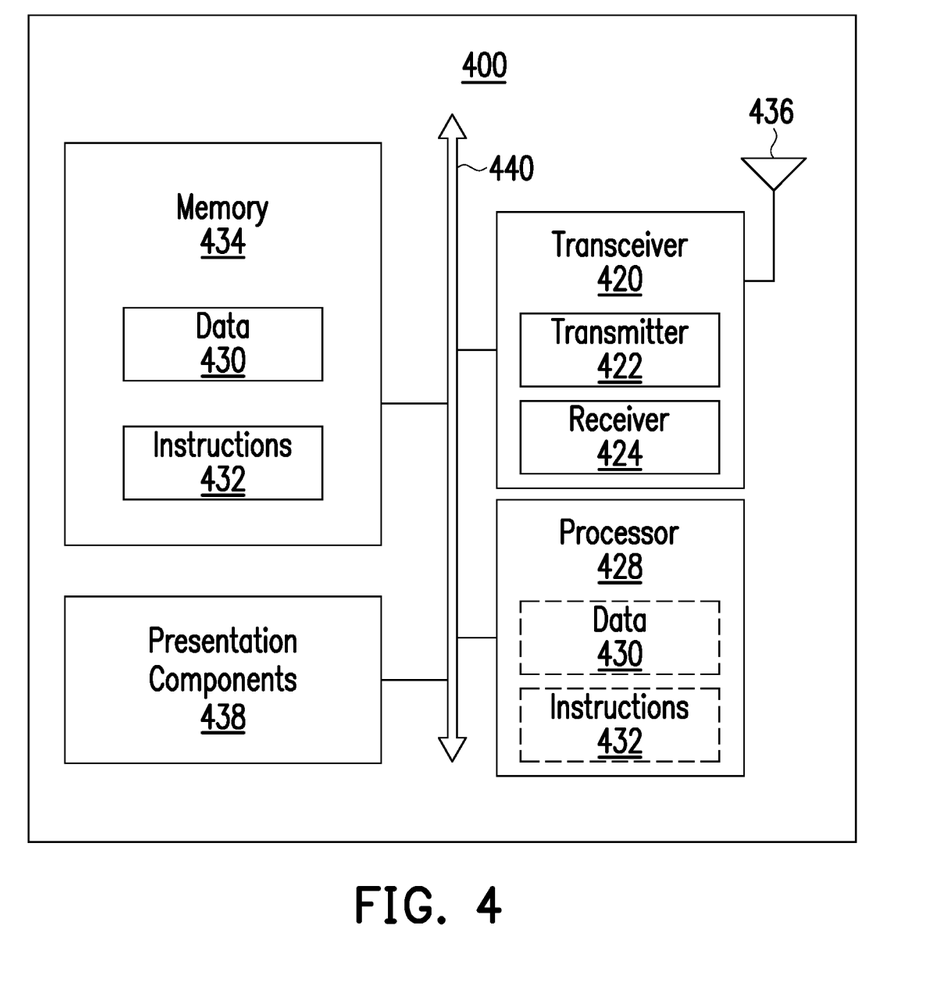
FIG. 4 is a block diagram illustrating a node for wireless communication, according to an example embodiment of the present disclosure.

FIG. 4 illustrates a block diagram of a node for wireless communication, in accordance with various aspects of the present application. As shown in FIG. 4, a node 400 may include a transceiver 420, a processor 428, a memory 434, one or more presentation components 438, and at least one antenna 436. The node 400 may also include an RF spectrum band module, a base station communications module, a network communications module, and a system communications management module, Input/Output (I/O) ports, I/O components, and power supply (not explicitly shown in FIG. 4). Each of these components may be in communication with each other, directly or indirectly, over one or more buses 440. In one embodiment, the node 400 may be a UE or a base station (or called a network device) that performs various functions described herein, for example, with reference to FIGS. 1 to 3.

The transceiver 420 having a transmitter 422 (e.g., transmitting/transmission circuitry) and a receiver 424 (e.g., receiving/reception circuitry) may be configured to transmit and/or receive time and/or frequency resource partitioning information. In some embodiments, the transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media can be any available media that can be accessed by the node 400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 434 may include computer-storage media in the form of volatile and/or non-volatile memory. The memory 434 may be removable, non-removable, or a combination thereof. Exemplary memory includes solid-state memory, hard drives, optical-disc drives, and etc. As illustrated in FIG. 4, The memory 434 may store computer-readable, computer-executable instructions 432 (e.g., software codes) that are configured to, when executed, cause the processor 428 to perform various functions described herein, for example, with reference to FIGS. 1 to 3. Alternatively, the instructions 432 may not be directly executable by the processor 428 but be configured to cause the node 400 (e.g., when compiled and executed) to perform various functions described herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information through the transceiver 420, the baseband communications module, and/or the network communications module. The processor 428 may also process information to be sent to the transceiver 420 for transmission through the antenna 436, to the network communications module for transmission to a core network.

One or more presentation components 438 presents data indications to a person or other device. Exemplary presentation components 438 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain embodiments, a person of ordinary skill in the art would recognize that changes may be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure.

What is claimed is:

1. A method related to Physical Uplink Shared Channel (PUSCH) repetitions, adapted for a user equipment (UE), the method comprising:
   transmitting a Physical Random Access Channel (PRACH) preamble;
   receiving a Random Access Response (RAR) message responding to the PRACH preamble, wherein the RAR message comprises an uplink grant that schedules a Message 3 (Msg3) PUSCH;
   determining a Transport Block Size (TBS) for a Transport Block (TB) based on a first number of bits of a Modulation and Coding Scheme (MCS) field in the uplink grant;
   selecting a number of PUSCH repetitions from a set of candidate numbers of PUSCH repetitions based on a second number of bits of the MCS field in the uplink grant; and
   transmitting the Msg3 PUSCH for the TB with the number of PUSCH repetitions.

2. The method of claim 1, wherein the MCS field in the uplink grant comprises a number of bits which is equal to a sum of the first number of bits and the second number of bits.

3. The method of claim 1, further comprising:
   receiving system information, wherein the system information indicates the set of candidate numbers of PUSCH repetitions.

4. The method of claim 1, further comprising:
   receiving system information; and
   selecting the number of PUSCH repetitions from a predefined set of candidate numbers of PUSCH repetitions based on the MCS field in the uplink grant in response to the set of candidate numbers of PUSCH repetitions not comprised in the system information.

5. The method of claim 1, further comprising:
   receiving system information, wherein the system information comprises configuration of a set of predefined PRACH preambles used for requesting the Msg3 PUSCH with PUSCH repetitions.

6. The method of claim 5, further comprising:
   selecting the PRACH preamble from the set of predefined PRACH preambles used for requesting Msg3 PUSCH with PUSCH repetitions.

7. The method of claim 5, further comprising:
   selecting the PRACH preamble from the set of predefined PRACH preambles used for requesting Msg3 PUSCH with PUSCH repetitions in response to a Synchronization Signal Block (SSB) having a Reference Signal Received Power (RSRP) below a threshold.

8. The method of claim 3, wherein the system information is system information block 1 (SIB1).

9. A user equipment (UE) comprising:
   a transceiver, used for transmitting or receiving signals;
   a memory, used for storing a program code; and
   a processor, coupled to the transceiver and the memory, and configured to load and execute the program code to perform:
   transmitting, through the transceiver, a Physical Random Access Channel (PRACH) preamble;
   receiving, through the transceiver, a Random Access Response (RAR) message responding to the PRACH preamble, wherein the RAR message comprises an uplink grant that schedules a Message 3 (Msg3) PUSCH;
   determining a Transport Block Size (TBS) for a Transport Block (TB) based on a first number of bits of a Modulation and Coding Scheme (MCS) field in the uplink grant;
   selecting a number of PUSCH repetitions from a set of candidate numbers of PUSCH repetitions based on a second number of bits of the MCS field in the uplink grant; and
   transmitting, through the transceiver, the Msg3 PUSCH for the TB with the number of PUSCH repetitions.

10. The UE of claim 9, wherein the MCS field in the uplink grant comprises a number of bits which is equal to a sum of the first number of bits and the second number of bits.

11. The UE of claim 9, wherein the processor is further configured for:
    receiving, through the transceiver, system information, wherein the system information indicates the set of candidate numbers of PUSCH repetitions.

12. The UE of claim 9, wherein the processor is further configured for:
    receiving, through the transceiver, system information; and
    selecting the number of PUSCH repetitions from a predefined set of candidate numbers of PUSCH repetitions based on the MCS field in the uplink grant in response to the set of candidate numbers of PUSCH repetitions not comprised in the system information.

13. The UE of claim 9, wherein the processor is further configured for:
    receiving, through the transceiver, system information, wherein the system information comprises configuration of a set of predefined PRACH preambles used for requesting the Msg3 PUSCH with PUSCH repetitions.

14. The UE of claim 13, wherein the processor is further configured for:
    selecting the PRACH preamble from the set of predefined PRACH preambles used for requesting Msg3 PUSCH with PUSCH repetitions.

15. The UE of claim 13, wherein the processor is further configured for:
    selecting the PRACH preamble from the set of predefined PRACH preambles used for requesting Msg3 PUSCH with PUSCH repetitions in response to a Synchronization Signal Block (SSB) having a Reference Signal Received Power (RSRP) below a threshold.

16. The UE of claim 11, wherein the system information is system information block 1 (SIB1).

17. A method related to Physical Uplink Shared Channel (PUSCH) repetitions, adapted for a network device, the method comprising:
    receiving a Physical Random Access Channel (PRACH) preamble;
    transmitting a Random Access Response (RAR) message responding to the PRACH preamble, wherein the RAR message comprises an uplink grant that schedules a Message 3 (Msg3) PUSCH, and a Transport Block Size (TBS) for a Transport Block (TB) is indicated by a Modulation and Coding Scheme (MCS) field in the uplink grant; and
    receiving the Msg3 PUSCH for the TB with a number of PUSCH repetitions, wherein
    the number of PUSCH repetitions is one of a set of candidate numbers of PUSCH repetitions indicated by the MCS field in the uplink grant, a first number of bits of the MCS field in the uplink grant is used for indicating the TBS for the TB, and a second number of bits of the MCS field in the uplink grant is used for indicating the number of PUSCH repetitions from the set of candidate numbers of PUSCH repetitions.

* * * * *